UNITED STATES PATENT OFFICE 2,465,067

DYE INTERMEDIATES

James Oliver Corner and David Willcox Woodward, Wilmington, Del., assignors to E. I. du Pont de Nemours & Company, Wilmington, Del., a corporation of Delaware No Drawing. Application July 3, 1947,
Serial No. 758,988

5 Claims. (Cl. 260—338)

This invention is concerned with new hydroxy- and acyloxy-aromatic amidoaldehydes and lower acetals thereof and their preparation. More particularly, it relates to 1-hydroxy- and 1-acyloxy-naphthamido-benzaldehydes and their acetals with lower monohydric and dihydric alcohols.

An object of this invention is to provide a new class of 1-hydroxy and 1-acyloxynaphthamido-benzaldehydes and lower acetals thereof. A more specific object is to provide such aldehydes and lower acetals thereof which are useful as dye intermediates. A further object is to provide 1-hydroxy and 1-acyloxynaphthamido-benzaldehydes and their lower acetals which are intermediates for the preparation of polymeric color formers. A still further object is to provide practical procedures for making such aldehydes. Still other objects will be apparent from the following detailed description of the invention.

The novel 1-hydroxy- and 1-acyloxynaphthamido-benzaldehydes of this invention may be represented by the nucleus possessing the general formula:

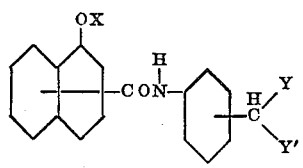

wherein X is hydrogen or an acyl radical, Y and Y' are together oxygen or the residue —O-R-O— (R being the divalent hydrocarbon radical attached to the oxygen atoms) of a glycol of two to three carbon atoms, e. g., ethylene glycol, 1,3-propylene glycol, 1,2-propylene glycol, and 1,3-butylene glycol, and separately an alkoxy group of one to four carbon atoms, e. g., methoxy, ethoxy, propoxy, and butoxy. In the above formula one of the positions ortho or para to the hydroxyl group is unsubstituted or contains a group replaceable in dye coupling reactions, such as a halogen atom, e. g., chlorine or bromine, or a sulfonic acid group. The remaining positions in the aromatic rings may be substituted with any substituents which do not interfere with azo dye coupling or color coupling development reactions contained in color formers, e. g., alkyl, aryl, alkoxy, aryloxy, halogen, nitro, amino, acylamino, sulfonic acid, carboxylic acid, sulfonamide, trifluoromethyl, or beta-hydroxyethyl groups.

The acyl radicals, X in the compounds, can be hydrolyzed to hydroxyl groups by warming in aqueous alkaline or acid solutions. Thus stirring in 50/50 ethyl alcohol-water solution containing 2% sodium carbonate at 90° C. will completely hydrolyze the acyloxy group in one hour or less. Another convenient method consists in heating the compounds for 5 to 60 minutes in the presence of aqueous ammonia or sodium hydroxide at a temperature of 50° to 90° C. These acyl radicals may correspond to those of an aliphatic or aromatic carboxylic acid chloride or an aliphatic or aromatic sulfonic acid chloride or bromide or carbonic acid ester or other acylating agent.

The above compounds can advantageously be prepared from available 1-naphthol carboxylic acids by converting them to the corresponding acid chlorides by reaction with thionyl chloride, phosphorous trichloride, phosphorous oxychloride, or phosphorous pentachloride or mixtures thereof. Before this conversion is effected, however, the hydroxy group may be protected by acylation, for example, with various types of an acylating agent, such as acetyl chloride, acetic anhydride, ethyl chlorocarbonate, benzoyl chloride, p-toluenesulfonyl chloride, etc. In general, an acylating agent which is quite reactive and readily forms esters is used. The naphthol carboxylic acid chloride or acyloxynaphthalene carboxylic acid chloride is then condensed with an aminobenzaldehyde or simple acetal thereof, i. e., dimethyl, diethyl, ethylene glycol, etc., acetals, in a liquid medium in the presence of a basic agent capable of removing or neutralizing the hydrogen chloride formed. Suitable acid neutralizing agents that can be used are alkali metal carbonates, bicarbonates, acetates, hydroxides, phosphates, or organic bases, such as pyridine, trialkylamines, triethanolamine, etc. Useful liquid media include dioxane, water, water- dioxane, ether, acetone, acetone-water, dimethylformamide, etc. In place of carboxylic acid chlorides there may be used carboxylic acid halides other than the chlorides, e. g., the corresponding bromides, but the chlorides are of most practical use.

Although compounds having the above general formula may be prepared from any of the isomeric substituted and unsubstituted 1-hydroxy-naphthalenecarboxylic acids, i. e., when the carboxylic acid group is in the 2, 3, 4, 5, 6, 7, and 8 position, the preferred compounds hereof are those prepared from ortho-isomers, that is, from substituted and unsubstituted 1 - hydroxy - 2 - naphthalene carboxylic acid.

These new hydroxy and acyloxy aromatic amidoaldehydes and acetals may be condensed with polyvinyl alcohols or hydrolyzed interpolymers of vinyl esters with other vinyl monomers to form polyacetals according to the methods of United States Patent 2,310,943, or by any other suitable modification thereof. Thus the color-forming aldehyde and polyvinyl alcohol can be stirred together in suspension or solution in an organic or aqueous organic solvent system containing a catalytic amount of a strong acid, e. g., phosphoric, sulfuric, hydrochloric, formic, chloroacetic, etc., and an acetal recovered.

The 1-hydroxy- and 1-acyloxy-naphthalene 2-amidobenzaldehyde derivatives are preferred since the polyvinyl acetals prepared therefrom yield, on color development of developable silver halide images, blue-green dyes which are superior in color transmission and absorption, i. e., they approach more closely the theoretical requirement of a minus red dye than do the related isomeric compounds.

The invention will be further illustrated but it is not intended to be limited by the following examples in which the parts are by weight unless otherwise stated.

EXAMPLE I

*m-(1-hydroxy-2-naphthamido)benzaldehyde ethylene glycol acetal*

1-hydroxy-2-naphthoyl chloride is prepared by adding 100 parts of thionyl chloride to a solution of 94 parts of 1-hydroxy-2-naphthoic acid in 250 parts of dry dioxane at 60° C., stirring for one hour and then allowing it to stand at 25° C. for 12 to 18 hours. Excess thionyl chloride and dioxane are distilled off under reduced pressure at 50° C. and the residue of acid chloride is diluted with 150 parts of dry dioxane. The dioxane solution of acid chloride is added dropwise to a mixture of 70 parts of anhydrous potassium carbonate, 60 parts of water, 300 parts of dioxane, and 80 parts of m-aminobenzaldehyde ethylene glycol acetal while stirring at 5 to 10° C. After the addition is complete, the mixture is stirred at 5 to 10° C. for one hour, then at room temperature for two hours. The solid which separates during the reaction period is filtered off and washed thoroughly with 50% dioxane. The combined filtrate and washings are stirred and diluted with water, and stirring is continued until the waxy solid has hardened. The crude amidobenzaldehyde acetal product which is collected on a filter and dried represents a 50 to 55% yield of impure product based on 1-hydroxy-2-naphthoic acid. Recrystallization from acetone yields 60 parts of m-(1-hydroxy-2-naphthamido)benzaldehyde ethylene glycol acetal, melting point 132–134° C. Further recrystallization of this material from chloroform or carbon tetrachloride gives crystals melting at 145° to 147° C. Analysis: calculated for $C_{20}H_{17}O_4N$: C=71.6; H=5.11; N=4.18. Found: C=71.59; H=5.15; N=4.23

EXAMPLE II

*m-(1-acetoxy-2-naphthamido)benzaldehyde ethylene glycol acetal*

1-acetoxy-2-naphthoic acid is prepared by dissolving 100 parts of 1-hydroxynaphthoic acid in 250 parts of acetic anhydride containing ten parts of concentrated sulfuric acid and heating at 80° to 100° C. for two to four hours. The reaction mixture is cooled and poured with stirring into 1000 parts of ice and water and allowed to stir until the oil is solidified. The brown solid, melting point 130° to 140° C., is collected on a filter, dried and recrystallized from benzene or alcohol to yield 50 parts of 1-acetoxy-2-naphthoic acid, melting point 152° to 154° C. The corresponding acid chloride is prepared with thionyl chloride and reacted with m-aminobenzaldehyde ethylene glycol acetal, each after the manner described in Example I.

EXAMPLE III

*m-(1-carbethoxy-2-naphthamido)benzaldehyde ethylene glycol acetal*

A solution of 235 parts of 1-hydroxy-2-naphthoic acid in 500 parts of purified dioxane is treated with 320 parts of dimethylaniline. The mixture is stirred at 0° C. and treated with 122 parts of ethyl chlorocarbonate. The mixture is stirred for one-half hour, then poured in a thin stream into 4000 parts of water containing 120 parts of concentrated hydrochloric acid. The granular precipitate which forms is isolated and washed with water. The yield is 315 parts of 1-carbethoxy-2-naphthoic acid, melting point 102° C. A solution is made of 246 parts of the carbethoxy derivative in 350 parts of dry benzene and treated with 130 parts of thionyl chloride. The mixture is heated at 50° to 60° C. for one hour, then evaporated under reduced pressure at 60° C. The residue is dissolved in 250 parts of dioxane and added to the following mixture while stirring at 0° C.: 105 parts of potassium bicarbonate, 300 parts of water, 600 parts of dioxane, 155 parts of m-aminobenzaldehyde ethylene glycol acetal. After the addition is complete, stirring is continued for one hour, then 400 parts of water is added to the thick mixture. The solid is separated by filtration, washed with 25% dioxane, and dried. The yield is 350 parts of light tan solid, melting point 83° to 86° C. Recrystallization from benzene yields m-(1-carbethoxy-2-naphthamido)benzaldehyde ethylene glycol acetal, melting point 86° to 91° C.

EXAMPLE IV

*m-(4-halo-1-hydroxy-2-naphthamido)benzaldehyde ethylene glycol acetal*

4-bromo- and 4-chloro-1-hydroxy-2-naphthoic acid are prepared as described by Weil, Ber. 44, 3060 (1911). The acid chlorides are prepared in dioxane solution as described in Example I and treated with m-aminobenzaldehyde ethylene glycol acetal as described in Example I. The crude product is purified by recrystallization from a mixture of acetone/chloroform (1/1) to yield pure 4-bromo derivative; (melting point 194°) and 4-chloro derivative (melting point 182°), respectively, in about 50% yields (based on haloacid).

EXAMPLE V

*m-(1-hydroxy-2-naphthamido)benzaldehyde*

The acetal group of the color former of Example I is removed by treating a solution of 167 parts of the color former in 500 parts of acetone with ten parts of 10% hydrochloric acid. The mixture is cooled in ice and the precipitated aldehyde is separated by filtration and washed with acetone. Recrystallization from dioxane yields 95 parts of the free aldehyde, melting point 205° to 206° C.

EXAMPLE VI

Polyvinyl acetal color formers are prepared from m-(1-hydroxy-2-naphthamido)benzaldehyde, its ethylene glycol acetal, or acyloxy derivatives by reaction with polyvinyl alcohol under acidic conditions as follows: A mixture of 3000 parts of ethylene glycol, 30 parts of 85% phosphoric acid, and 500 parts of polyvinyl alcohol is stirred at 25° C. and a solution of 100 parts of m-(1-hydroxy-2-naphthamido)benzaldehyde in 600 parts of dioxane is added. The reaction mixture is stirred at 25° C. for 15 minutes, then at 65–75° C. for 60 minutes or more. It is cooled to about 50° C., 5000 parts of acetone added, and the finely divided solid is separated by filtration. The solid is suspended in methanol and dilute ammonium hydroxide is added to neutralize the acid catalyst. After filtration, the product is washed by stirring with methanol (one change) and acetone (two changes), and dried. The yield of m-(1-hydroxy-2-naphthamido)benzaldehyde polyvinyl acetal is about 550 parts. If a slightly more water-sensitive polyacetal is desired, a solution containing 10–40 parts of orthosulfobenzaldehyde sodium salt in 150 parts of ethylene glycol is added to the reaction mixture before the heating step.

The polyvinyl alcohol used in Example VI was obtained by completely hydrolyzing polyvinyl acetate and had a solution viscosity (4% in water) of 18–24 centipoises at 20° C. Other completely hydrolyzed polyvinyl acetates ranging in viscosity from 5 to 50 centipoises in 4% aqueous solution have also been found useful. However, the process is not limited to the use of this particular type of vinyl alcohol polymer since other polyvinyl alcohols prepared by polymerizing a vinyl ester, e. g., vinyl acetate, vinyl chloroacetate, vinyl propionate, vinyl butyrate, etc., followed by partial or complete hydrolysis and, if desired, by further reaction to introduce minor portions of other modifying groups, e. g., acetal, ester, or ether groups, etc., are operable. Hydrolyzed interpolymers of vinyl esters with minor (3.0% or less by weight) portions of other vinyl compounds, e. g., vinyl chloride, alkyl acrylates, methacrylates, etc., are often useful in preparing the hydrophilic dye intermediates, especially where a lower degree of water solubility is desired. Such polymers have a straight chain, the major portion of which consists solely of —$CH_2$— and —CHOR— groups in equal number, where R is mainly H.

Still other useful products are the water-soluble, hydrolyzed olefin/vinyl ester interpolymers and especially the hydrolyzed ethylene/vinyl acetate interpolymers described in United States Patents 2,386,347 and 2,397,866.

A solution is prepared from the color formers described in the Example VI by stirring at 70° C. for one hour, ten parts of polymer, 60 parts of ethanol, and 130 parts of water. One-half of this solution is stirred at 25° C. and treated simultaneously with the following two solutions in the absence of light: (a) 31 parts of 3 N ammonium bromide, three parts of 0.5 N potassium iodide, and 50 parts of water and (b) 29 parts of 3 N silver nitrate, 50 parts of water and 17 parts of 28% ammonium hydroxide. After stirring for one-half hour, 150 parts of 15% sodium sulfate solution is added. The coagulated silver halide color-former emulsion is shredded and washed for one hour in running water. The remainder of the original polymer solution is added to the washed coagulate and the mixture is stirred at 65° C. for one-half hour. The emulsion is coated on a suitable support, such as paper or transparent film base.[1] The resulting photographic element is exposed to form a latent image, then developed in a solution of the following composition prepared by dissolving the ingredients in 500 parts of water and diluting to 1000 parts.

| | Parts |
|---|---|
| p-Aminodiethylaniline hydrochloride | 2 |
| Sodium sulfite (anhydrous) | 10 |
| Sodium carbonate (anhydrous) | 20 |
| Potassium bromide | 2 |

The developed picture is then washed, bleached in 4% potassium ferricyanide, fixed in 25% sodium thiosulfate and washed. The resulting element contains a strong blue-green negative dye image.

In place of the specific naphthol acid chloride in Examples I and II, there can be used other such acid chlorides. Useful additional compounds include the following:

1-ethylcarbonato-2-naphthoyl chloride
1-benzoxy-2-naphthoyl chloride
1-acetoxy-3-naphthoyl chloride
1-acetoxy-5-naphthoyl chloride
1-acetoxy-4-chloro-2-naphthoyl chloride
1-acetoxy-4-chloro-6-naphthoyl chloride
1-acetoxy-2,4-dichloro-6-naphthoyl chloride
1-acetoxy-2-chloro-7-naphthoyl chloride
1-acetoxy-2-methyl-7-naphthoyl chloride
1-acetoxy-8-chloro-2-naphthoyl chloride In place of the m-aminobenzaldehyde ethylene glycol acetal of Example I, other aminobenzaldehydes or their dialkyl or lower glycol acetals may be employed to prepare useful products according to the present invention. Additional suitable compounds of this type include:

o-Aminobenzaldehyde
p-Aminobenzaldehyde
2-chloro-3-aminobenzaldehyde
4-chloro-3-aminobenzaldehyde
4-methyl-3-aminobenzaldehyde
2-or 3-amino-6-formylbenzoic acid
3-amino-2-formyl benzenesulfonic acid
5-amino-2-formyl benzenesulfonamide, and the acetals thereof. The N-monoalkyl or N-monoaryl derivatives of the above-mentioned aldehydes are also useful.

The conditions of the reactions are not limited to those described in the above examples. In general, the condensation can be carried out at temperatures between —10° C. and 100° C., although the range of 0° C. to 30° C. is the most practical.

These new 1-hydroxy and 1-acyloxynaphthamidobenzaldehydes are also useful in preparing dyes for applications to textiles, fibers, filaments, and films. These dyes retain the reactive function and can thus react with the film or fiber substrate to produce fast-to-washing dyed articles. Substrates, such as cellulosic fibers, e. g., cotton, viscose yarn, etc., protein fibers, e. g., wool, silk, casein fibers, etc., containing hydroxyl, amino, or amide groups are most readily capable of condensation with the aldehyde group.

Polyvinyl acetals prepared from these new aldehydes are of value in other color photograpic processes where it is desired to have a 1-naphthol dye intermediate structure, such as in the azo process of United States Patents 2,297,732; 2,342,620; 2,220,929; and 2,339,213. They are also of value in the textile dyeing process where polymeric dye intermediates are admixed with the fiber-forming material before spinning. Treatment of the fiber with a diazotized amine forms a dye of high wash fastness.

---

[1] All operations are carried on in the absence of actinic radiation.

As mentioned previously the quinoneimine dyes formed by color-coupling development of silver halide in the presence of the 2-naphthamides of this invention possess outstanding spectral absorption characteristics which made them suitable for use as minus-red components in three-color photography. In addition to this fact, the dyes possess remarkable light-fastness as compared to the usual color-developed dyes. The color formers of this invention are even more stable to light than the corresponding sulfonamide color formers. It will be appreciated that in color photographic processes the presence of stains and impurities is to be avoided rigorously. The present compounds have been found to be admirably suited for the preparation of stain-free brilliant color photographs by the procedure of United States Patent 2,397,864 and it is believed that one reason for this is the fact that they can be prepared in a high state of purity before carrying out the final polymer-forming acetalization reaction with polyvinyl alcohol. In addition to these advantages, the compounds can be prepared in good yield from available, economical, commercial intermediates thus lending themselves to a commercially practical procedure.

What is claimed is:

1. A compound taken from the group consisting of aldehydes of the general formula:

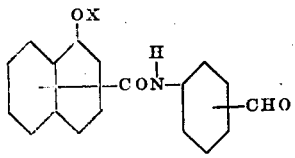

and acetals thereof with a hydroxy compound taken from the class consisting of alkanols of 1 to 4 carbon atoms and 1,2- and 1,3-alkanediols of 2 to 4 carbon atoms wherein X is a member taken from the group consisting of hydrogen and acyl radicals.

2. An aldehyde of the general formula

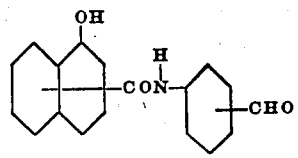

3. An acetal of the general formula

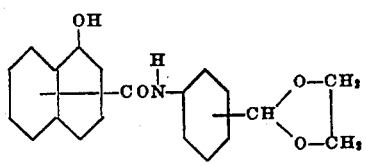

4. An aldehyde of the general formula

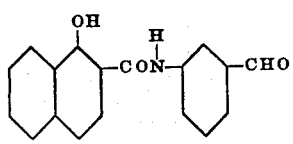

5. An acetal of the general formula

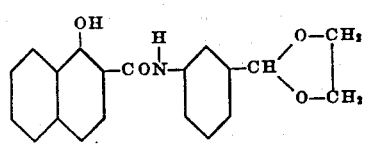

JAMES OLIVER CORNER.
DAVID WILLCOX WOODWARD.

REFERENCES CITED

The following references are of record in the file of this patent:

UNITED STATES PATENTS

| Number | Name | Date |
|---|---|---|
| 2,186,719 | Frohlich et al. | Jan. 9, 1940 |
| 2,423,572 | Woodward et al. | July 8, 1947 |